United States Patent
Sander et al.

(10) Patent No.: US 8,130,790 B2
(45) Date of Patent: Mar. 6, 2012

(54) DIGITAL COMMUNICATIONS SYSTEM WITH VARIABLE-BANDWIDTH TRAFFIC CHANNELS

(75) Inventors: Wendell B. Sander, Los Gatos, CA (US); Barry Corlett, Brisbane, CA (US); David John Tupman, San Francisco, CA (US); Brian Sander, San Jose, CA (US); Jeffrey J. Terlizzi, San Francisco, CA (US); Andrew Bright, Los Gatos, CA (US); Anup Sharma, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/887,468

(22) Filed: Sep. 21, 2010

(65) Prior Publication Data

US 2011/0194569 A1    Aug. 11, 2011

Related U.S. Application Data

(60) Provisional application No. 61/302,505, filed on Feb. 8, 2010.

(51) Int. Cl.
   *H04J 3/16* (2006.01)
(52) U.S. Cl. ............. 370/468; 381/1; 381/300; 381/302
(58) Field of Classification Search .................. 370/464, 370/468; 381/1, 300, 302
   See application file for complete search history.

(56) References Cited

U.S. PATENT DOCUMENTS

| | | | |
|---|---|---|---|
| 4,932,022 A * | 6/1990 | Keeney et al. ................ | 370/271 |
| 5,392,223 A | 2/1995 | Caci | |
| 5,513,183 A | 4/1996 | Kay et al. | |
| 6,269,093 B1 | 7/2001 | Alapuranen et al. | |
| 6,647,000 B1 * | 11/2003 | Persson et al. ................ | 370/330 |
| 7,026,537 B2 | 4/2006 | Ishii | |
| 7,054,280 B2 | 5/2006 | Novak et al. | |
| 7,802,284 B2 * | 9/2010 | Kim ................................ | 725/44 |
| 2005/0238060 A1 | 10/2005 | Kuntz et al. | |

(Continued)

FOREIGN PATENT DOCUMENTS

WO          0249314          6/2002

OTHER PUBLICATIONS

Corlett et al., U.S. Appl. No. 12/887,472, filed Sep. 21, 2010.
"GSM Frame Structure", [online], retrieved Mar. 10, 2010, <http://www.radio-electronics.com/info/cellulartelecomms/gsm_technical/frames-structure-super-hyper.php>.

*Primary Examiner* — Hassan Kizou
*Assistant Examiner* — Charles C Jiang
(74) *Attorney, Agent, or Firm* — Treyz Law Group; G. Victor Treyz; David C. Kellogg

(57) ABSTRACT

Electronic devices and equipment may communicate over a wired communications path. The wired communications path may include one or more wires and may be associated with a headphone cable. Data may be conveyed in the form of a digital data stream containing multiple traffic channels. The digital data stream may include superframes, each of which has multiple frames of data. The frames of data may each contain a number of data slots. Some of the slots in a superframe may be used exclusively by a particular one of the traffic channels. Boundary slots may be shared between traffic channels. Data interface circuitry may implement a data dispersion algorithm that determines the pattern in which data from each traffic channel is distributed within each boundary slot. Transmitting data interface circuitry may merge traffic channels into a single data stream. Receiving data interface circuitry may reconstruct the traffic channels.

16 Claims, 9 Drawing Sheets

| Slots per Superframe | | Chan a | | Chan b | | Chan c | | Chan d | | | | | |
|---|---|---|---|---|---|---|---|---|---|---|---|---|---|
| | | 54 | | 70 | | 23 | | 38 | | | | | |
| SLOT # = | | 1 | 2 | 3 | 4 | 5 | 6 | 7 | 8 | 9 | 10 | 11 | 12 | 13 |
| Frame | R | | | | | | | | | | | | |
| 0 | 0 | a | a | a | b | b | b | b | b | c | c | d | d | |
| 1 | 7 | a | a | a | b | b | b | b | b | c | d | d | d | |
| 2 | 14 | a | a | a | b | b | b | c | c | d | d | | | |
| 3 | 5 | a | a | a | a | b | b | b | b | c | c | d | d | |
| 4 | 12 | a | a | a | b | b | b | b | c | d | d | | | |
| 5 | 3 | a | a | a | a | b | b | b | b | c | d | d | d | |
| 6 | 10 | a | a | a | b | b | b | b | b | c | d | d | | |
| 7 | 1 | a | a | a | a | b | b | b | b | c | c | d | d | |
| 8 | 8 | a | a | a | b | b | b | b | c | d | d | d | | |
| 9 | 15 | a | a | a | b | b | b | c | c | d | d | | | |
| 10 | 6 | a | a | a | b | b | b | b | b | c | d | d | | |
| 11 | 13 | a | a | a | b | b | b | b | c | c | d | | | |
| 12 | 4 | a | a | a | a | b | b | b | b | c | d | d | d | |
| 13 | 11 | a | a | a | b | b | b | b | c | c | | | | |
| 14 | 2 | a | a | a | a | b | b | b | b | c | c | d | | |
| 15 | 9 | a | a | a | b | b | b | b | b | c | d | | | |

U.S. PATENT DOCUMENTS

| | | |
|---|---|---|
| 2006/0002323 A1 | 1/2006 | Hildebrand et al. |
| 2006/0018279 A1 | 1/2006 | Agrawal et al. |
| 2006/0097955 A1 | 5/2006 | Kato |
| 2006/0171345 A1 | 8/2006 | Hildebrand et al. |
| 2007/0005841 A1 | 1/2007 | Lin et al. |
| 2007/0207824 A1 | 9/2007 | Bhattacharjee et al. |
| 2009/0219917 A1 | 9/2009 | Prakash et al. |
| 2011/0182433 A1* | 7/2011 | Takada ............................ 381/22 |

* cited by examiner

| Slots per Superframe | | Chan a | | Chan b | | Chan c | | Chan d | | | | |
|---|---|---|---|---|---|---|---|---|---|---|---|---|
| | | 54 | 70 | | 23 | | 38 | | | | | |
| SLOT # = | 1 | 2 | 3 | 4 | 5 | 6 | 7 | 8 | 9 | 10 | 11 | 12 | 13 |
| Frame | R | | | | | | | | | | | | |
| 0 | 0 | a | a | | | | | | | | | | |
| 1 | 7 | a | a | a | b | b | b | b | c | c | d | d | d |
| 2 | 14 | a | a | a | b | b | b | b | c | c | d | d | d |
| 3 | 5 | a | a | a | b | b | b | b | c | c | d | d | |
| 4 | 12 | a | a | a | b | b | b | b | c | c | d | d | d |
| 5 | 3 | a | a | a | b | b | b | b | c | c | d | d | d |
| 6 | 10 | a | a | a | b | b | b | c | c | c | d | d | |
| 7 | 1 | a | a | a | b | b | b | b | c | c | d | d | d |
| 8 | 8 | a | a | a | b | b | b | b | c | c | d | d | d |
| 9 | 15 | a | a | a | b | b | b | b | c | c | d | d | d |
| 10 | 6 | a | a | a | b | b | b | b | c | c | d | d | d |
| 11 | 13 | a | a | a | b | b | b | c | c | c | d | d | d |
| 12 | 4 | a | a | a | b | b | b | b | c | c | d | d | d |
| 13 | 11 | a | a | a | b | b | b | b | c | c | d | d | d |
| 14 | 2 | a | a | a | b | b | b | b | c | c | d | d | d |
| 15 | 9 | a | a | a | b | b | b | b | c | c | d | d | d |

FIG. 9

DIGITAL COMMUNICATIONS SYSTEM WITH VARIABLE-BANDWIDTH TRAFFIC CHANNELS

This application claims the benefit of provisional patent application No. 61/302,505, filed Feb. 8, 2010, which is hereby incorporated by reference herein in its entirety.

BACKGROUND

Electronic devices such as computers, media players, and cellular telephones typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used in electronic devices such as notebook computers and media players, because audio connectors such as these are relatively compact.

Audio connectors that are commonly used for handling stereo audio have a tip connector, a ring connector, and a sleeve connector and are sometimes referred to as three-contact connectors or TRS connectors. In devices such as cellular telephones, it is often necessary to convey microphone signals from the headset to the cellular telephone. In arrangements in which it is desired to handle both stereo audio signals and microphone signals, an audio connector typically contains an additional ring terminal. Audio connectors such as these have a tip, two rings, and a sleeve and are therefore sometimes referred to as four-contact connectors or TRRS connectors.

Audio signals are typically conveyed between electronic devices and accessories in analog form. For example, left and right audio tracks are typically conveyed to a stereo headset as analog signals using "left channel" and "right channel" wires in a headset cable.

Improving audio fidelity and supporting additional audio channels with this type of analog signaling scheme may be difficult or impossible without providing additional analog signal wires in the headset cable. Arrangements of this type may not be compatible with existing audio connectors.

It would therefore be desirable to be able to provide improved techniques for conveying signals such as audio signals between electronic devices and external equipment.

SUMMARY

Electronic devices and equipment may communicate over a wired communications path. The wired communications path may include one or more wires and may be associated with a cable such as a cable for a pair of headphones or other accessory. The electronic devices and equipment may include components that produce and consume audio data such as microphone and speakers.

Audio data and other data may be conveyed over the wires of the cable using differential transmitter and receiver circuitry. Data may be conveyed in the form of a digital data stream containing multiple traffic channels. The digital data stream may include superframes, each of which has multiple frames of data. The frames of data may each contain a number of data slots. Some of the slots in a superframe may be used exclusively by a particular one of the traffic channels. Boundary slots may be shared between traffic channels. Data interface circuitry may implement a data dispersion algorithm that determines the pattern in which data from each traffic channel is distributed within each boundary slot. Transmitting data interface circuitry may merge traffic channels into a single data stream at one end of the wired communications path. Receiving data interface circuitry may reconstruct the traffic channels at the other end of the wired path. The reconstructed traffic channels can then be distributed to respective speakers or other components.

Further features of the invention, its nature and various advantages will be more apparent from the accompanying drawings and the following detailed description of the preferred embodiments.

BRIEF DESCRIPTION OF THE DRAWINGS

FIG. 9 is a table showing how bytes of data in different traffic channels may be allocated among the slots of frames in a superframe in accordance with an embodiment of the present invention.

DETAILED DESCRIPTION

Figure 1:
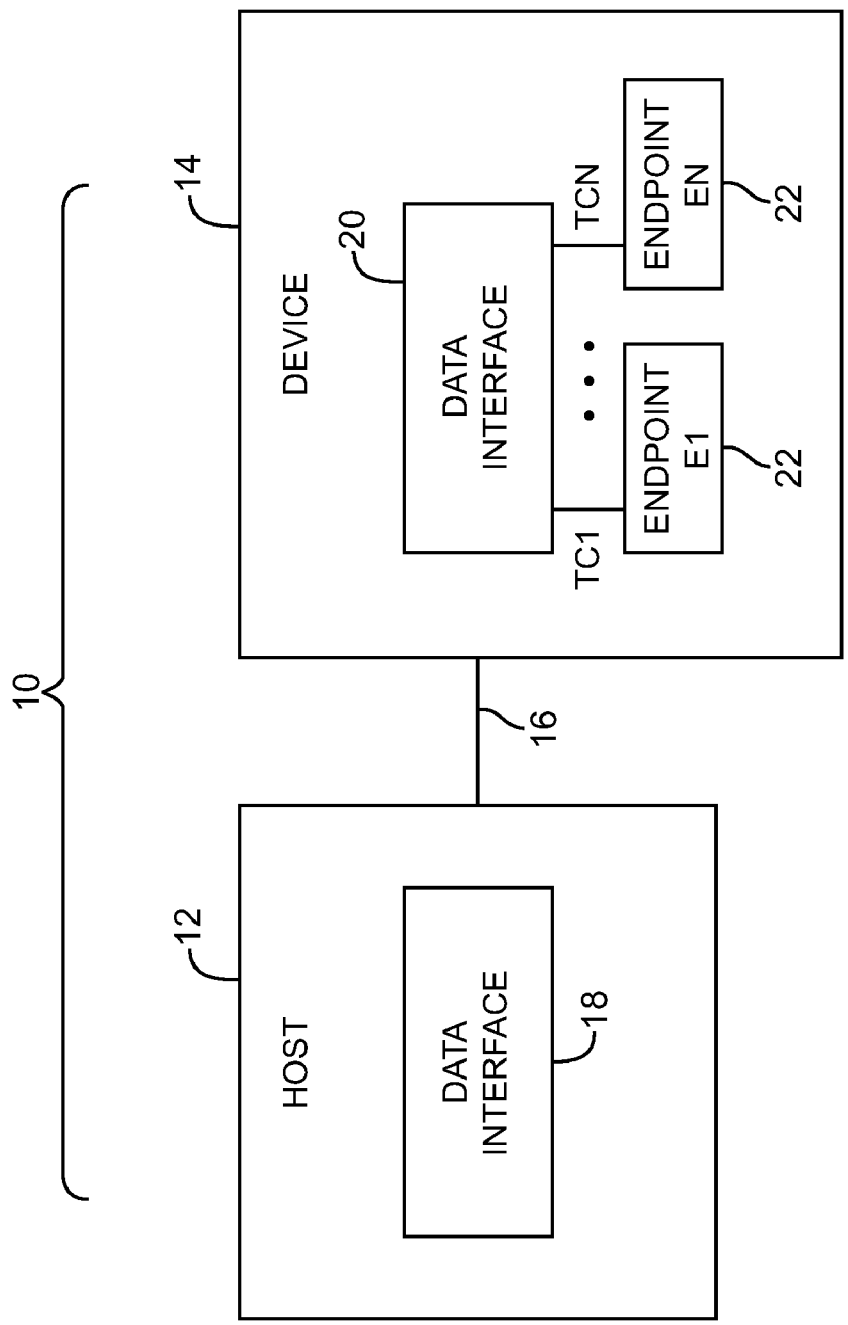
FIG. 1 is a schematic diagram of an illustrative electronic device in communication with an accessory such as a headset or other external equipment in a system in accordance with an embodiment of the present invention.

Electronic components such as electronic devices and other equipment may be interconnected using wired and wireless paths. For example, a wireless path may be used to connect a cellular telephone with a wireless base station.

Wired and wireless paths may be used to connect electronic devices to equipment such as computer peripherals and audio accessories. As an example, a user may use a wired or wireless path to connect a portable music player to a headset.

Electronic devices that may be connected to external equipment using wired or wireless paths include desktop computers and portable electronic devices. The portable electronic devices may include laptop computers and small portable computers of the type that are sometimes referred to as ultraportables. The portable electronic devices may also include somewhat smaller portable electronic devices such as wrist-watch devices, pendant devices, and other wearable and miniature devices.

The electronic devices that are connected to external equipment may also be handheld electronic devices such as cellular telephones, media players with wireless communications capabilities, handheld computers (also sometimes called personal digital assistants), remote controllers, global positioning system (GPS) devices, and handheld gaming devices. The electronic devices may also be hybrid devices that combine the functionality of multiple conventional devices. Examples of hybrid electronic devices include a cellular telephone that includes media player functionality, a gaming device that includes a wireless communications capability, a cellular telephone that includes game and email functions, and a portable device that receives email, supports mobile telephone calls, has music player functionality, and supports web browsing. These are merely illustrative examples.

An example of external equipment that may be connected to such electronic devices is an accessory such as a headset. A headset typically includes a pair of speakers that a user can use to play audio from the electronic device. A headset or other accessory may also have one or more microphones and a user interface such as one or more buttons or a display. When a user supplies input to the user control interface, the input may be conveyed to the electronic device.

The external equipment that is connected to the device may also include equipment such as an adapter. The adapter may be, for example, a tape adapter having an audio plug on one end and having a cassette at the other end that slides into a tape deck such as an automobile tape deck. Equipment such as a tape adapter may be used to play music or other audio over the speakers associated with the tape deck. Audio equipment such as the stereo system in a user's home or automobile may also be connected to an electronic device. As an example, a user may connect a music player to an automobile sound system.

Accessories such as headsets are typically connected to electronic devices using audio plugs (male audio connectors) and mating audio jacks (female audio connectors). Audio connectors such as these may be provided in a variety of form factors. Most commonly, audio connectors take the form of 3.5 mm (⅛") miniature plugs and jacks. Other sizes are also sometimes used such as 2.5 mm subminiature connectors and ¼ inch connectors. In the context of accessories such as headsets, these audio connectors and their associated cables are generally used to carry analog signals such as audio signals for speakers and microphone signals. Digital connectors such as universal serial bus (USB) and Firewire® (IEEE 1394) connectors may also be used by electronic devices to connect to external equipment such as headsets, but it is generally preferred to connect headsets to electronic devices using standard audio connectors such as the 3.5 mm audio connector. Digital connectors such as USB connectors and IEEE 1394 connectors are primarily of use where large volumes of digital data need to be transferred with external equipment such as when connecting to a peripheral device such as a printer. Optical connectors, which may be integrated with digital and analog connectors, may be used to convey data between an electronic device and an associated accessory, particularly in environments that carry high bandwidth traffic such as video traffic. If desired, audio connectors may include optical communications structures to support this type of traffic.

The audio connectors that may be used in connecting an electrical device to external equipment may have a number of contacts. Stereo audio connectors typically have three contacts. The outermost end of an audio plug is typically referred to as the tip. The innermost portion of the plug is typically referred to as the sleeve. A ring contact lies between the tip and the sleeve. When using this terminology, stereo audio connectors such as these are sometimes referred to as tip-ring-sleeve (TRS) connectors. The sleeve can serve as ground. The tip contact can be used in conjunction with the sleeve to handle a left audio channel and the ring contact can be used in conjunction with the sleeve to handle the right channel of audio (as an example). In four-contact audio connectors an additional ring contact is provided to form a connector of the type that is sometimes referred to as a tip-ring-ring-sleeve (TRRS) connector. Four-contact audio connectors may be used to handle a microphone signal, left and right audio channels, and ground (as an example).

Electrical devices and external equipment may also be operated in various modes. For example, a cellular telephone may be used in a music player mode to play back stereo audio to a user. When operated in telephone mode, the same cellular telephone may be used to play telephone call left and right audio signals to the user while simultaneously processing telephone call microphone signals from the user. When playing back audio that contains more than two channels of information (e.g., 5.1 surround sound), five or more channels of audio data may be played back simultaneously. Noise cancellation functions involve the transmission of one or more audio streams associated with microphones.

In a typical scenario, an electronic device that is connected to external equipment with a wired path may produce audio signals. These audio signals may be transmitted to the external equipment in the form of analog audio (as an example). The external equipment may include a microphone. Microphone signals (e.g., analog audio signals corresponding to a user's voice or other sounds) may be conveyed to the electronic device using the wired path. The wired path may also be used to convey other signals such as power signals and control signals.

In some situations, it may be difficult or impossible to convey signals in analog form. For example, when a device and headset are coupled using four-contact audio connectors (e.g., a 3.5 mm TRRS jack and plug) and an associated four-wire cable, there may not be a sufficient number of analog signal paths to support multichannel audio (e.g., 5.1 surround sound audio). Analog formats may also be more subject to noise than digital signals.

These shortcomings of analog formats may be addressed by providing the electronic device and external equipment with digital communications capabilities. By transmitting data efficiently, power consumption can be minimized and battery life can be extended. Efficient digital communications schemes can be implemented that avoid encoding data with an excessive number of data bits per channel and that avoid encoding data using excessive bit rates. Latency can adversely affect audio performance, so care can be taken with such efficient digital communications schemes to transmit data in a way that minimizes latency.

An illustrative system in which electronic equipment may use digital communications schemes such as these is shown in FIG. 1. As shown in FIG. 1, system 10 may include an electronic device such as electronic device 12 and external equipment 14. Electronic device 12 may sometimes be referred to as a host. External equipment 14 may sometimes be referred to as an electronic accessory or device.

Electronic device 12 may be a desktop or portable computer, a portable electronic device such as a handheld electronic device that has wireless capabilities, equipment such as a television or audio receiver, or any other suitable electronic equipment. Electronic device 12 may be provided in the form of stand-alone equipment (e.g., a handheld device that is carried in the pocket of a user) or may be provided as an embedded system. Examples of systems in which device 12 may be embedded include automobiles, boats, airplanes, homes, security systems, media distribution systems for commercial and home applications, display equipment (e.g., computer monitors and televisions), etc.

External equipment 14 may be equipment such as an automobile with a sound system, consumer electronic equipment such as a television or audio receiver with audio capabilities, a peer device (e.g., another electronic device such as device 12), an accessory such as a headset, or any other suitable electronic equipment. Equipment 14 may include one or more endpoints 22. Each endpoint may be associated with an electronic component that generates or consumes data such as a speaker or microphone.

Device 12 may contain data interface circuitry 18. Equipment 14 may contain data interface circuitry 20. Data interface circuitry 18 and 20 can be used as transmitters and receivers. During digital communications, data interface 18 may package digital data that is created in device 12 and may transmit this data to equipment 14 over path 16. Data interface 20 may receive the transmitted data from path 16 and may distribute the digital data over respective traffic channels TC1 ... TCN to endpoints 22. The process of transferring data from device 12 to equipment 14 may sometimes be referred to as a downlink process and data interface 18 may sometimes be referred to as a downlink interface.

Digital data may also be transmitted from endpoints 22 to device 12. This process may sometimes be referred to as an uplink process and data interface 20 may sometimes be referred to in this capacity as an uplink interface. During uplink operations, data traffic on each of traffic channels TC1 ... TCN is combined by the uplink interface into a data stream for transmission across path 16.

An example of a downlink process is the distribution of audio data to speakers. Equipment 14 may, for example, contain five speakers (drivers, sets of drivers, etc.). The audio data that is distributed may, for example, correspond to five channels of audio data. Data interface 20 may receive a stream of data from data interface 18 over path 16. The stream of data may include data bytes corresponding to each of the five audio data channels. Data interface 20 may separate the stream of audio data into five respective traffic channels each of which carries the audio data for a respective one of the five audio channels. Five respective endpoints may receive the digital data and, using internal digital-to-analog converter circuitry, amplifier circuitry, and drivers, may play back the five channels of audio.

An example of an uplink process is the distribution of microphone audio from one or more microphone-based endpoints 22 in equipment 14. Microphones may be used to gather noise cancellation data or voice data for a telephone call. Endpoints may be provided with analog-to-digital converter circuitry that digitizes microphone signals. The microphone signals from one or more endpoints may be provided to data interface 20 over one or more corresponding traffic channels TC1 ... TCN. Data interface 20 may multiplex the audio data from each of the microphones onto path 16 as a stream of digital data.

Path 16 may include a cable having conductive lines. There may, in general, be any suitable number of lines in path 16. For example, there may be two, three, four, five, or more than five separate lines. These lines may be part of one or more cables. Cables may include solid wire, stranded wire, shielding, single ground structures, multi-ground structures, twisted pair structures, or any other suitable cabling structures.

To ensure compatibility with legacy devices such as conventional headsets, it may be advantageous to use standard audio connectors such as 3.5 mm audio connectors at one or both of the ends of the conductive lines in path 16. Connectors such as these are in wide use for handling audio signals. Audio connectors such as 3.5 mm audio connectors are also relatively compact, which allows the size of device 12 and equipment 14 to be minimized. The conductive lines of path 16 may be contained within a cable. Audio connectors may be provided at one or both ends of the cable. In cables with audio connectors at only one end, the other cable end may be used to form a hardwired connection. In a typical arrangement, one end of the cable may be hardwired to circuitry in equipment 14 and the other end of the cable may be provided with a male audio connector (i.e., a TRRS plug). Device 12 may be provided with a mating female audio connector (i.e., a TRRS jack).

Figure 2:
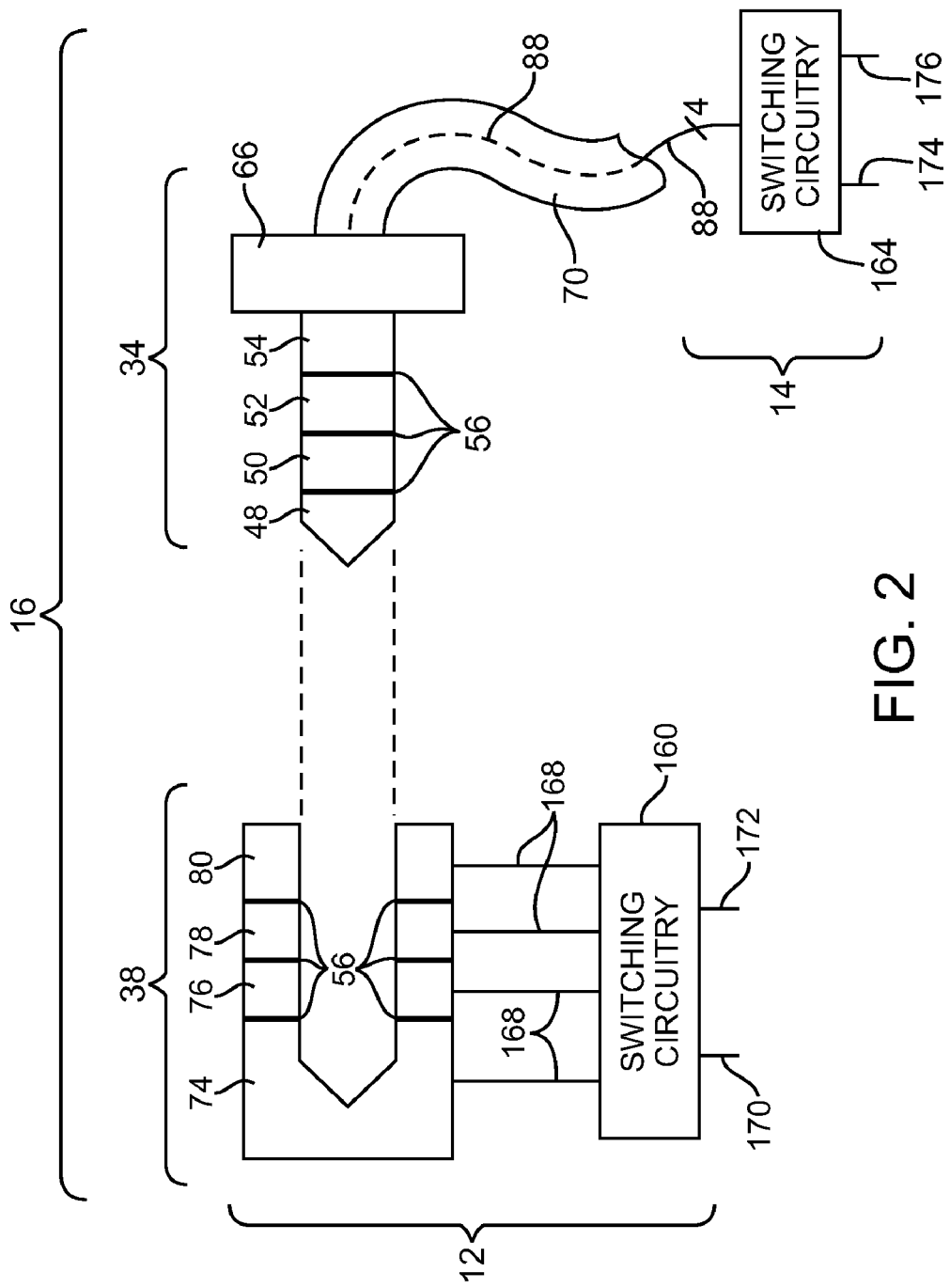
FIG. 2 is a diagram of illustrative audio connectors and associated switching circuitry that may be used in an electronic device and external equipment to form a wired communications path between the electronic device and external equipment in accordance with an embodiment of the present invention.

An illustrative arrangement of this type is shown in FIG. 2. As shown in FIG. 2, path 16 may include conductive lines 88 in cable 70. One end of cable 70 may be terminated in equipment 14. The other end of cable 70 may be provided with audio plug 34. Audio plug 34 may mate with audio jack 38 in device 12.

As shown in FIG. 2, switching circuitry 160 may be provided in electronic device 12 and switching circuitry 164 may be provided in equipment 14. In analog signaling modes, switching circuitry 160 may be configured so that analog signal lines 170 are coupled to the contacts of jack 38 and switching circuitry 164 may be configured so that analog signal lines 174 are coupled to the contacts of plug 34. In digital signaling modes, switching circuitry 160 may be configured so digital signal lines 172 are coupled to the contacts of jack 38 and switching circuitry 164 may be configured so that digital signal lines 176 are coupled to the contacts of plug 34. Mixed modes in which a combination of digital and analog signals are present may also be supported. Analog lines 170 and 174 may, if desired, be used to convey power supply signals.

Audio plug 34 is an example of a four-contact plug. A four-contact plug has four conductive regions that mate with four corresponding conductive regions in a four-contact jack such as jack 38. As shown in FIG. 2, these regions may include a tip region such as region 48, ring regions such as rings 50 and 52, and a sleeve region such as region 54. These regions surround the cylindrical surface of plug 34 and are separated by insulating regions 56. When plug 34 is inserted in mating jack 38, tip region 48 may make electrical contact with jack tip contact 74, rings 50 and 52 may mate with respective ring regions 76 and 78, and sleeve 54 may make contact with sleeve terminal 80. In a typical configuration, there are four wires in cable 70, each of which is electrically connected to a respective contact.

The signal assignments that are used in audio connectors 46 depend on the type of electronic device and accessory being used. In one typical configuration, ring 52 may serve as ground. During analog signal communications, tip 48 and ring 52 may be used together to handle a left analog audio channel (e.g., signals for a left-hand speaker in a headset) and ring 50 and ring 52 may be used for right channel analog audio. In equipment that contains a microphone, ring 52 and sleeve 54 may be used to carry analog microphone audio signals from the equipment to electronic device 12 during analog signaling modes. Other signal assignments may be used if desired.

During digital communications, the wires of cable 70 and the corresponding contacts of connectors 38 and 34 may be used to carry digital signals. For example, one or more pairs of conductors in cable 70 and one or more corresponding pairs of contacts in connectors 38 and 34 may be used to implement a differential signaling scheme of the type shown in FIG. 3.

Electrical connections between mating pairs of contacts in jack 38 and plug 34 may be made at terminals C1 and C2. Device 12 may include a differential transmitter TA and a differential receiver RA. Equipment 14 may include a differential transmitter TB and a differential receiver RB. During downlink operations, device 12 may receive single-ended data on input INA and may use transmitter TA to transmit this data in differential form over conductive lines W1 and W2 (i.e., a twisted pair of wires 88 in cable 70 of FIG. 2). Receiver RB may receive the transmitted differential signals and may convert the received differential signals into single-ended digital data on output OUTB. During uplink operations, single-ended data on input INB of transmitter TB in equipment 14 may be transmitted to receiver RA in device 12 in differential form using transmitter TB. Receiver RA may convert received differential data into single-ended data on output OUTA. Wires W1 and W2 may be selected from any two of the wires in cable 70 (e.g., the left and right audio lines, the microphone and ground lines, etc.). Remaining lines may be used for additional data signals, analog signals, power signals, etc.

The signals that are conveyed over path 16 may include control signals, audio signals, video signals, or other suitable signals. The transmission and reception of audio signals is sometimes described herein as an example.

Figure 4:
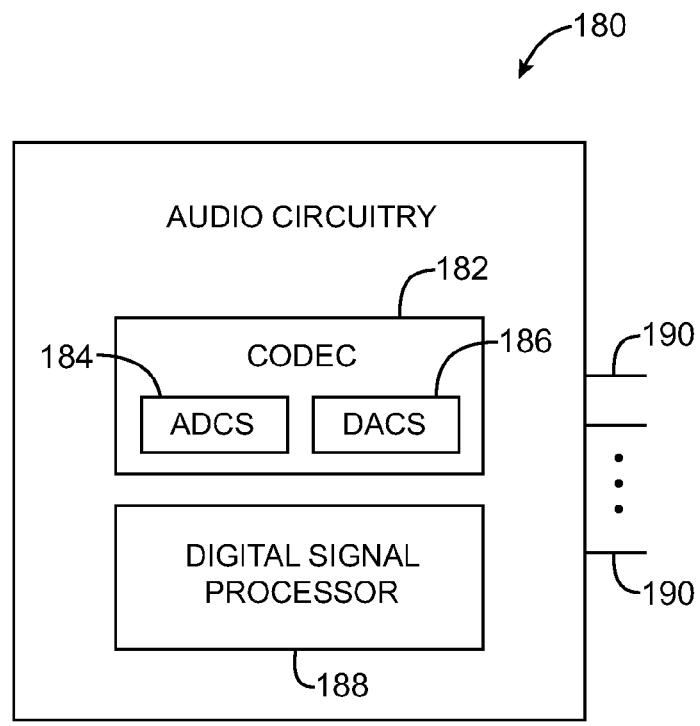
FIG. 4 is a circuit diagram of illustrative electronic device circuitry that may generate and consume data that is conveyed over a wired communications path of the type shown in FIG. 2 in accordance with an embodiment of the present invention.

FIG. 4 shows an illustrative audio circuit that may be used to process audio signals in system 10. Audio circuitry 180 may be located in device 12 or equipment 14. For example, audio circuitry 180 may be located in device 12 and may be used to generate analog audio signals and digital audio data. Audio codec 182 may be implemented using one or more integrated circuits. Codec 182 and other circuitry in audio circuitry 180 may include analog-to-digital converters 184 and digital-to-analog converters 186. Analog-to-digital converters 184 may be used to convert received analog signals (e.g., analog microphone signals from a microphone in device 12 or equipment 14) into digital audio data. Digital-to-analog converters 186 may be used to convert digital audio data into analog audio data (e.g., analog speaker signals). Digital signal processor 188 may be used to process digital audio data. For example, digital signal processor 188 may receive digital microphone signals over path 16 or from analog-to-digital converters 184 and may receive digital audio data corresponding to played back media from audio circuitry 180 in device 12 or equipment 14 and may process this digital information to produce noise-cancelled audio signals. Input-output lines 190 may be used for transmitting and receiving analog signals and digital signals. For example, a number of lines 190 may be used to transmit or receive digital data associated with respective traffic channels.

In a typical configuration, audio circuitry 180 may be located in device 12 and may transmit digital audio signals to one or more endpoints in equipment 14 while receiving digital audio data from one or more endpoints. Input-output lines 190 may be used in transmitting and receiving data. The endpoints in equipment 14 may include one or more endpoints that produce data for transmission to device 12 over path 16 and one or more endpoints that consume data that has been received from device 12 over path 16.

Figure 5:
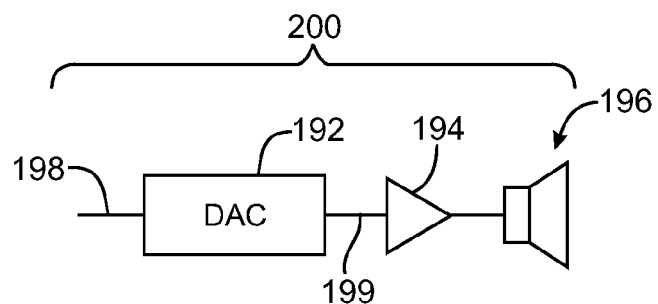
FIG. 5 is a circuit diagram of an illustrative speaker-based endpoint that may communicate with a host electronic device over a wired communications path of the type shown in FIG. 2 in accordance with an embodiment of the present invention.

An example of an endpoint that consumes data is a speaker-based endpoint of the type shown in FIG. 5. As shown in FIG. 5, endpoint 200 may include an input such as input 198 that receives digital data (e.g., data in a traffic channel) that has been conveyed over path 16. Digital-to-analog converter 192 converts digital signals on input 198 to analog signals on corresponding output 199. Amplifier 194 may amplify the analog signals on path 199 and may provide the amplified version of these analog signals to speaker 196 to produce sound.

Figure 6:
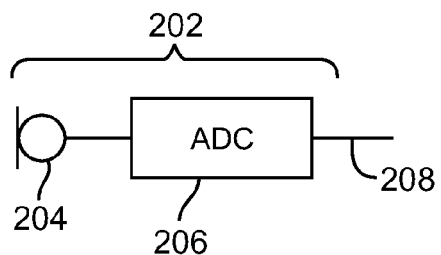
FIG. 6 is a circuit diagram of an illustrative microphone-based endpoint that may communicate with a host electronic device over a wired communications path of the type shown in FIG. 2 in accordance with an embodiment of the present invention.

An example of an endpoint that produces data is a microphone-based endpoint of the type shown in FIG. 6. As shown in FIG. 6, endpoint 202 may include a microphone such as microphone 204. Microphone 204 may convert sound into analog signals. Analog-to-digital converter 206 may convert analog microphone signals from microphone 204 into digital output signals on path 208 (e.g., data for a traffic channel).

Figure 7:
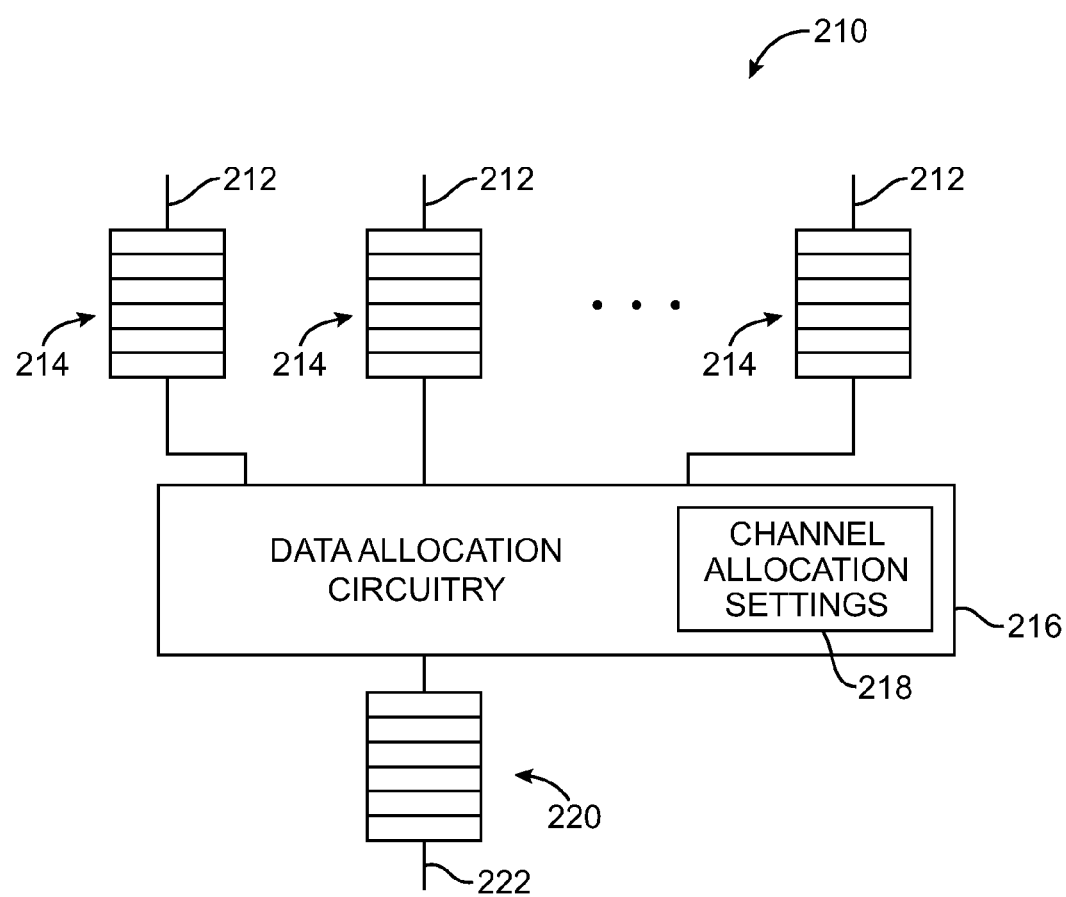
FIG. 7 is a circuit diagram showing illustrative data allocation circuitry that may serve as an interface between multiple traffic channels and a stream of digital data conveyed over a wired communications path of the type shown in FIG. 2 in accordance with an embodiment of the present invention.

FIG. 7 is a circuit diagram showing illustrative circuitry that may be used in implementing data interfaces such as data interface 18 and data interface 20 of FIG. 1. Each data interface may, in general, have a number of input-output paths such as paths 212 that are coupled to respective endpoints. Paths 212 may carry respective data traffic channels (e.g., traffic channels TC1 ... TCN of FIG. 1). Buffers 214 (e.g., first-in-first-out buffers) may be used to buffer input and output data and may serve as respective interfaces between data allocation circuitry 216 and the circuitry coupled to paths 212. Channel allocation settings 218 may be stored in memory in data allocation circuitry 216 (e.g., in registers in circuitry 216). Settings 218 may include information that data allocation circuitry 216 uses in multiplexing and demultiplexing data.

During a typical multiplexing operation, data input-output paths 212 receive data (e.g., from microphones in endpoints, from paths 190 of audio circuitry 180 of FIG. 4, or from other suitable sources). This data is temporarily stored in buffer circuitry 214. Each buffer may handle data for a respective data channel. Data allocation circuitry 216 uses channel allocation information 218 to allocate the data from each buffer into an appropriate location in an outgoing data stream. This outgoing data stream may be transmitted via first-in-first out buffer 220 and path 222. Path 222 may, for example, be coupled to input INA or input INB of FIG. 3.

Figure 3:
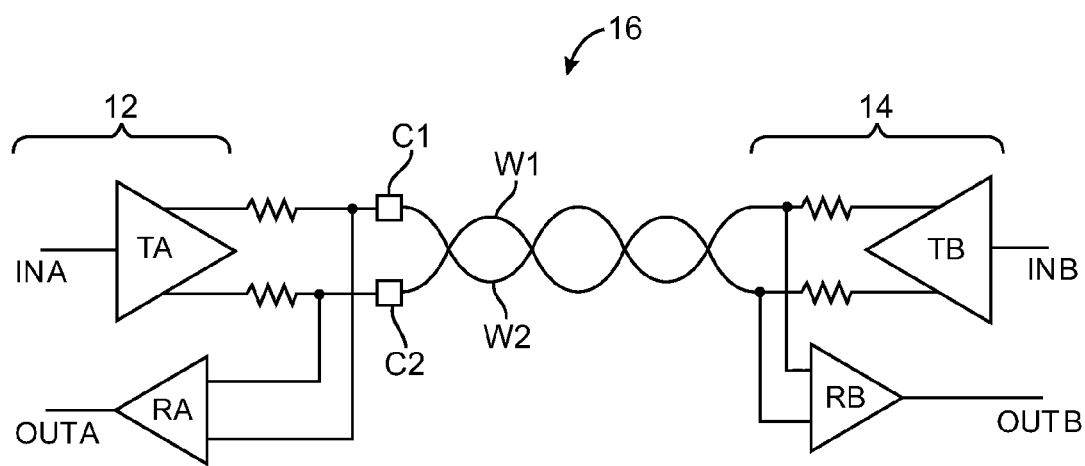
FIG. 3 is a circuit diagram showing how differential signaling may be used to convey digital data over a communications path of the type shown in FIG. 2 in accordance with an embodiment of the present invention.

During a typical demultiplexing operation, path 222 receives data from OUTA or OUTB of FIG. 3 and buffers this data in buffer 220. Data allocation circuitry 216 uses channel allocation settings 218 to determine how to demultiplex the data in the incoming data stream and thereby reconstruct the traffic channels. The demultiplexed data may, be routed to paths 212 via appropriate buffers 214.

Data allocation circuitry 216 may control the flow of data through buffers 214 and 220 by generating the clocks for each of these buffers. If, for example, a particular data item that has been received in buffer 220 is to be allocated to a particular traffic channel, data allocation circuitry 216 may generate a clock pulse for the buffer (e.g., one of buffers 214) that is associated with that traffic channel while simultaneously incrementing the clock for buffer 220. This will cause the data to move from buffer 220 into the appropriate one of buffers 214. The same type of buffer clock control scheme may be used when operating data allocation circuitry 216 in reverse (i.e., when allocating data from each traffic channel into a combined data stream on path 222).

Bidirectional data transmissions may be supported over path 16 by using a data interface circuit such as the circuit of FIG. 7 at each end of path 16. To avoid contention, the data interface circuits may take turns in transmitting and receiving data (i.e., a time sharing technique may be used in which path 16 serves either as an uplink path or a downlink path at any given time). Simultaneous uplink and downlink operations may also be supported (e.g., by providing additional physical paths or using circuitry that supports simultaneous bidirectional signaling).

Figure 8:
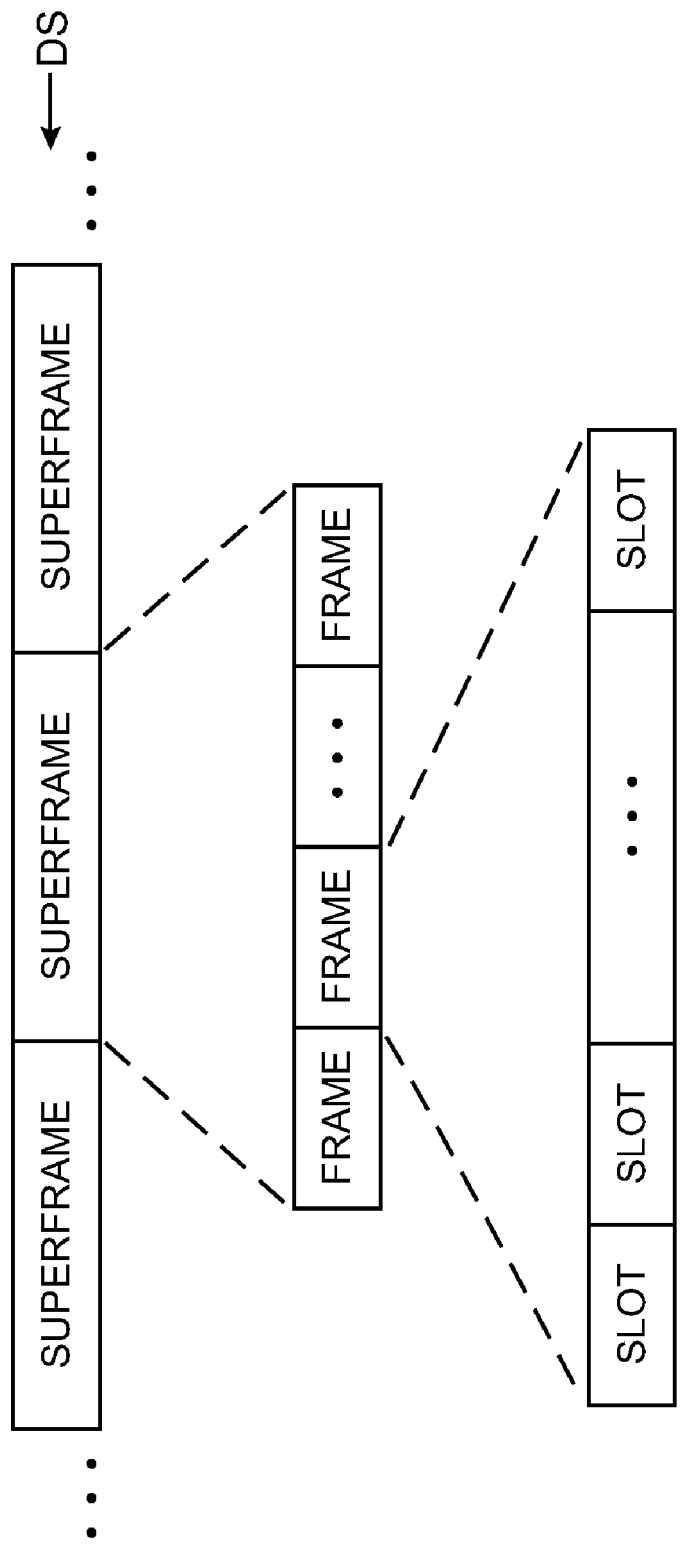
FIG. 8 is a diagram of illustrative data structures that may be used in conveying data over a wired communications path of the type shown in FIG. 2 in accordance with an embodiment of the present invention.

The digital data that is being transmitted and received by data interfaces 18 and 20 may be packaged using any suitable data structure arrangement. With one suitable configuration, which is illustrated in FIG. 8, data (e.g., data stream DS) is conveyed using a series of superframes. Each superframe may contain multiple frames. Each frame, in turn, may contain multiple data slots. Each data slot may be left empty or may be filled with a byte of data. The data byte in each slot may be unencoded (e.g., by using 8-bit or 16-bit words) or may be encoded (e.g., as 10 bit 8 B/10 B encoded data bytes).

There are three layers of data structures in the FIG. 8 example (superframes, frames, and slots). If desired, fewer nested layers of data structures or more nested layers of data structures may be used in data stream DS. The example of FIG. 8 is merely illustrative.

With one illustrative configuration, there may be 160 frames nested within each superframe and 34 data slots per frame. Each data slot that is filled with data may contain one 8-bit byte encoded using 8 B/10 B encoding (i.e., to form a 10 bit encoded version of the 8-bit byte). Other types of encoding and different numbers of frames and data slots may be used if desired. Each superframe may have a duration of 3 and a third milliseconds (as an example). The data rate for data stream DS may be, for example, about 9 MHz. This data rate is sufficiently low that twisted pair wires such as wires W1 and W2 of FIG. 3 can be treated as DC (direct-current) wires. At typical path lengths (e.g., less than one meter), the time delay experienced by signals traveling along wires W1 and W2 of path 16 is significantly less than a bit width. Using this type of signaling scheme, the amount of power that is consumed in conveying signals over path 16 may be fairly modest (e.g., less than 1 mW), making this type of scheme suitable for use with small battery-powered devices.

Audio data should be conveyed with low latency to avoid creating undesirable audio artifacts. Latency and power consumption can be minimized by distributing data evenly across the data slots, even when the steady state amount of data in each traffic channel does not evenly match an integral number of slots per frame.

The amount of data that is to be conveyed over each traffic channel may vary depending on factors such as user-defined and default settings, link quality, media type, encoding scheme, etc. For example, a voice telephone call without noise cancellation may require less bandwidth than a high quality 5.1 channel surround sound signal. The amount of bandwidth associated with data stream DS may therefore vary depending on the needs of system 10. In situations in which a relatively small bandwidth is needed, less data is conveyed per unit time. When relatively little data is being conveyed, many if not most of the data slots in each frame may be unoccupied, thereby reducing power consumption in the transmitter and receiver circuitry. When larger amounts of bandwidth are required, a correspondingly larger number of data slots may be occupied with data. In this type of situation, power consumption will be somewhat larger.

In some situations, the amount of bandwidth that is needed by a given traffic channel in path 16 may require use of a fractional number of data slots per frame (e.g., 3.375). This required number of data slots per frame can be satisfied by provisioning path 16 so that the given traffic channel is assigned a sufficiently large integral number of slots per frame (e.g., 4 slots/frame). While possible, this type of provisioning scheme over-allocates bandwidth to the given traffic channel and tends to increase power consumption.

To minimize power consumption while simultaneously minimizing latency to ensure high-quality audio playback, the number of slots that are allocated to each traffic channel can be allowed to vary from frame-to-frame. With this type of scheme, the average number of slots per frame need not be an integral number. Because slot assignments are continually varying, both the transmitter and receiver can be provided with information sufficient to identify the slot-fill pattern currently in use. At the data interface associated with the transmitting side of path 16, for example, data allocation circuitry such as data allocation circuitry 216 of FIG. 7 may use channel allocation settings 218 to determine how to distribute data from each traffic channel across slots and frames in data stream DS. At the data interface associated with the corresponding receiving side of path 16, data allocation circuitry such as data allocation circuitry 216 can use identical channel allocation settings to determine how to extract the data from data stream DS to reconstruct the traffic channels.

Consider, as an example, the arrangement shown in FIG. 9. In the example of FIG. 9, there are four different traffic channels: channel a, channel b, channel c, and channel d. Channel a has a bandwidth requirement of 54 slots per superframe, channel b has a bandwidth requirement of 70 slots per superframe, channel c has a bandwidth requirement of 23 slots per superframe, and channel d has a bandwidth requirement of 38 slots per superframe. The table of FIG. 9 shows the pattern in which data bytes for each traffic channel are distributed across the slots and frames of a single superframe. The superframe of FIG. 9 has 16 frames (0 . . . 15) and each frame has 13 slots. The number of frames and slots in the superframe of FIG. 9 have been chosen to help simplify the drawing. Other numbers of frames and slots may be used if desired.

As shown in FIG. 9, data traffic is distributed differently from frame to frame. In frame 0, slots 1-4 are filled with respective data bytes for traffic channel a, slots 5-8 are filled with respective data bytes for traffic channel b, slots 9 and 10 are filled with respective data bytes for traffic channel c, slots 11 and 12 are filled with respective data bytes for traffic channel d, and slot 13 is empty. In frame 1, slots 1-3 are filled with respective data bytes for traffic channel a, slots 4-8 are filled with respective data bytes for traffic channel b, slot 9 is filled with a data byte for traffic channel c, slots 10-12 are filled with respective data bytes for traffic channel d, and slot 13 is empty. The slots of subsequent frames are also filled differently.

As shown in FIG. 9, the point at which data transitions between adjacent channels is not even (i.e., the slot location at which channel a data transitions to channel b data varies from frame to frame). In frame 0, the transition between channel a and channel b occurs between slots 4 and 5, in frame 1, the transition between channel a and b occurs between slots 3 and 4, etc.

Figure 10:
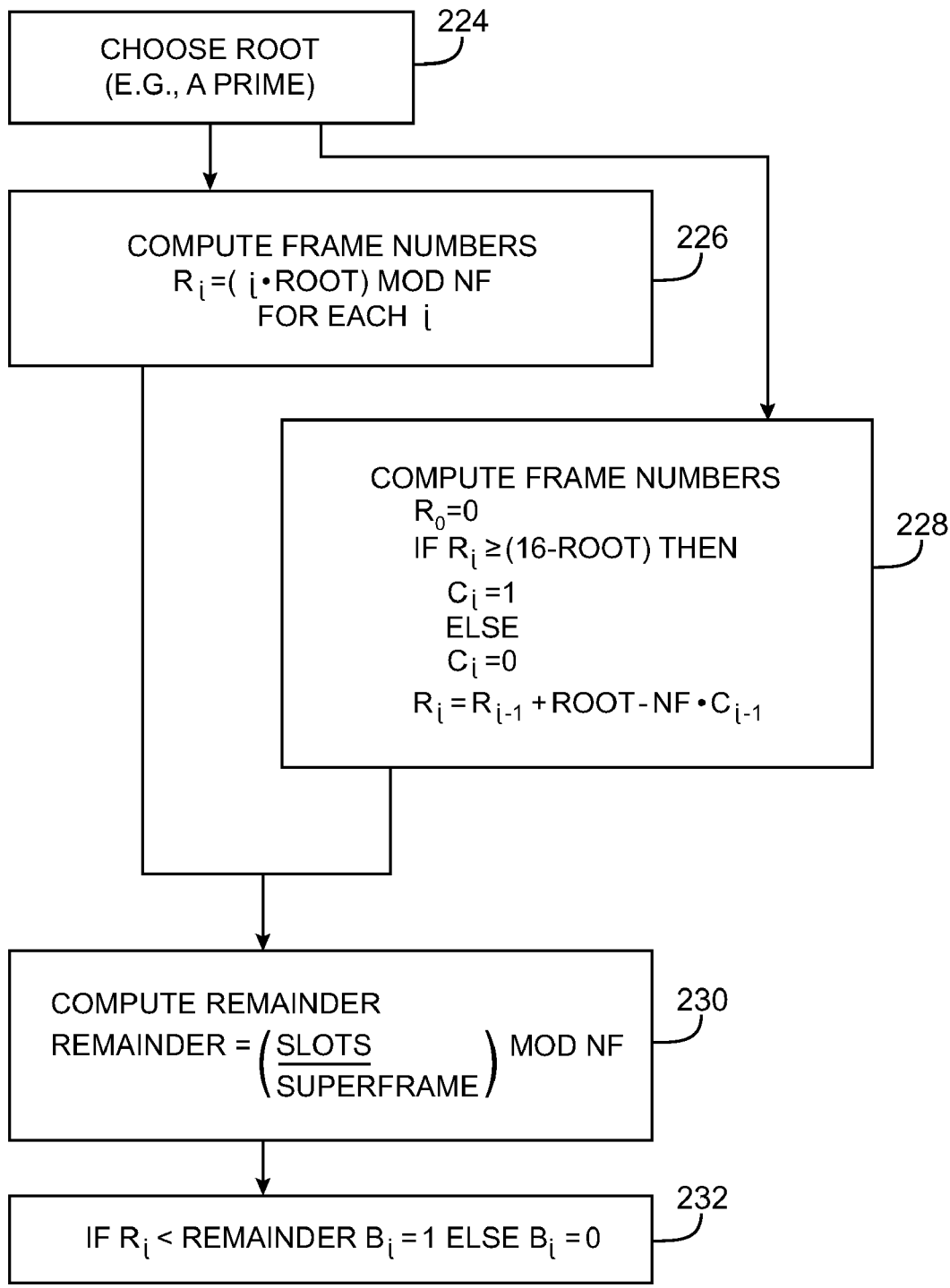
FIG. 10 is a flow chart of an illustrative steps involved in determining how to allocate data bytes within a data stream in accordance with an embodiment of the present invention.

An orderly process by which data from multiple traffic channels can be merged into a single data stream on one end of path 16 and can be extracted to reconstruct each of the multiple traffic channels on the other end of path 16 can be implemented using a data distribution algorithm. With one suitable arrangement, data interfaces 18 and 20 may each have data allocation circuitry (such as circuitry 216 of FIG. 7) that implements a data dispersion algorithm of the type shown in FIG. 10. the algorithm of FIG. 10 may be used, for example, to produce the data distribution of FIG. 9. The data dispersion algorithm determines the pattern in which data from each traffic channel is allocated to the slots in each frame. For example, the data dispersion algorithm allows both the transmitter and receiver to determine the slot locations of the transitions between channels for each frame. The algorithm of FIG. 10 is illustrative. Other data dispersion algorithms may be used by data interface circuitry 18 and 20 if desired.

At step 224, a root (ROOT) may be chosen for the data dispersion process. The parameter ROOT serves as a seed for the data dispersion algorithm. The root may be, for example, a suitable prime number. After selecting a value for ROOT, the index i may be initialized (e.g., to 0).

According to a first embodiment of the data dispersion algorithm of FIG. 10, processing then proceeds to step 226. According to a second embodiment of the data dispersion algorithm of FIG. 10, processing proceeds to step 228.

With the approach of step 226, the frame number parameter Ri is computed by computing the product of index i and ROOT modulo NF, where NF is the number of frames present in each superframe (16 in the example of FIG. 9). The approach of step 228 uses the alternative set of equations shown in FIG. 10 to compute each Ri value.

After computing the Ri value for each i (i.e., for all i values from 0 to NF-1, where NF is the number of frames per superframe), processing proceeds to step 230. During the operations of step 230, the value of REMAINDER is computed for each traffic channel by computing the cumulative number of slots per superframe for each traffic channel modulo NF. For channel a in the present example, SLOTS/SUPERFRAME is equal to 54 and NF is 16, so SLOTS/SUPERFRAME mod NF is 6. This value (i.e., 6 in this example) represents the number of extra bytes of data that are being filled into the slot at the boundary between channels a and b. This type of slot is sometimes referred to as a boundary slot. In computing REMAINDER for channel B, the cumulative value of SLOTS/SUPERFRAME is 124 (54 slots for traffic channel a plus 70 slots for traffic channel b). The value of REMAINDER for traffic channel b is therefore 12, because 124 mod 16 equals 12. Cumulative values for SLOTS/SUPERFRAME are likewise calculated when detecting the value of REMAINDER for traffic channel c (boundary slot 8) and traffic channel d (boundary slot 12).

As shown in FIG. 9, slots 1, 2, and 3 in each frame are filled with channel a data and are therefore not boundary slots. Similarly, slots 5, 6, and 7 are completely filled with data from traffic channel b and are not boundary slots. Slot 4 is, however, partially populated with data traffic from channel a and is partially populated with data traffic from channel b. Slot 4 therefore is a boundary slot (representing the boundary between channels a and b). Likewise, slot 8 is a boundary slot for channels b and c, etc.

At step 232, for each traffic channel, each Ri value is compared to the value of REMAINDER for that traffic channel. If Ri is less than REMAINDER for that traffic channel, Bi for that traffic channel is set to one (i.e., the boundary slot between that traffic channel and the next traffic channel is to be filled with data from the traffic channel). If Ri is greater than REMAINDER, Bi is set to zero (i.e., the boundary slot between that traffic channel and the next traffic channel is not to be filled with data from the traffic channel).

The way in which this process works to distribute data for channel a in a slot 4 can be seen by comparing the R values in the "R" column of the table of FIG. 9 to the computed remainder value for channel a (i.e., 6). In frame 0, R=0, and, because 0 is less than 6, B0 is set to 1 and data for channel a is used to fill slot 4 in frame 0. In frame 1, however, R=7, and, because 7 is greater than 6, B1 is set to 0 and no data for channel a is used to fill slot 4 in frame 1 (rather, data for channel b is used to fill slot 4 in frame 1). This scheme applies to all of the computed R values (R0 ... R15) in the "R" of FIG. 9 (i.e., all frames in the superframe).

The pattern of data bytes in each boundary slot (shown as channel allocation settings 218 in FIG. 7) may be cached for later use or the data dispersion algorithm of FIG. 10 may be used to compute the pattern of data bytes in each boundary slot in real time. Channel allocation information may be stored in any suitable format (e.g., using information on the values of REMAINDER, using information on the Ri values for all frames, using the Bi values for all frames, etc.).

Figure 11:
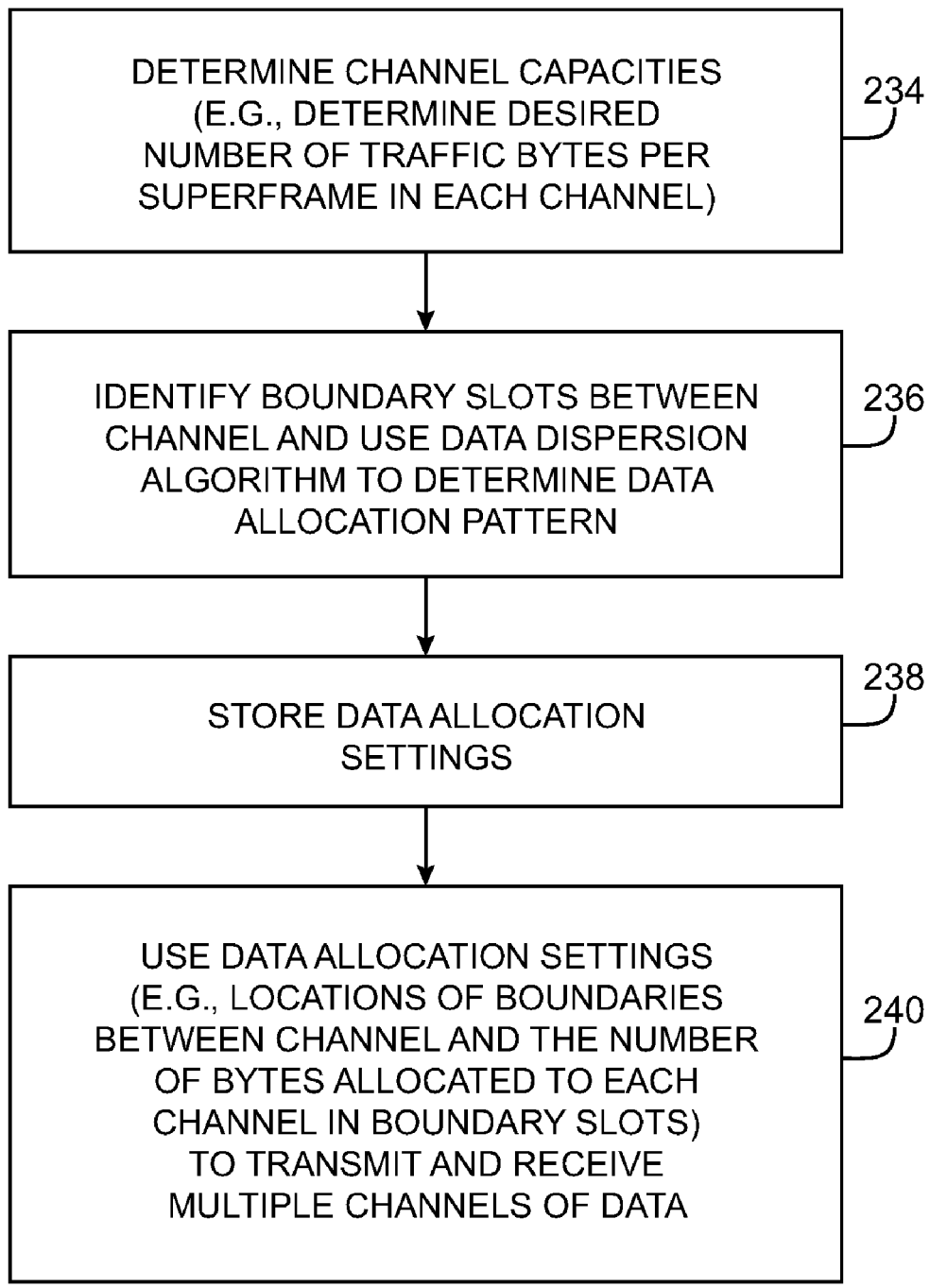
FIG. 11 is as flow chart of illustrative steps involved in conveying digital data over a communications path between an electronic device and external equipment in accordance with an embodiment of the present invention.

Illustrative steps involved in sending and receiving data over path 16 using data interface 18 and data interface 20 are shown in FIG. 11.

At step 234, the channel capacities for each of the data traffic channels are determined. For example, if device 12 desires to convey 5.1 channel surround sound signals while playing back audio from a media file, the required number of traffic channels and the bandwidth for each channel can be ascertained by the storage and processing circuitry of device 12. The capacity of each channel may be quantified in terms of the number of bytes of data to be transferred per superframe (e.g., 54 bytes/superframe for channel a in the example of FIG. 9).

At step 236, the locations of the boundary slots in each superframe may be determined (e.g., using the known number of bytes in each traffic channel that are to be transmitted per superframe). In the example of FIG. 9, the boundary slot for channel a is slot 4. During the operations of step 236, a data dispersion algorithm such as the algorithm of FIG. 10 may be used to determine the pattern in which data for each traffic channel is to be allocated to the slots of each frame. For example, the data dispersion algorithm may indicate how the data from each traffic channel is allocated within the boundary slot, as described in connection with FIG. 9. The results of the data dispersion algorithm may be stored at data interface 18 and data interface 20 (e.g., this information may be cached in data allocation circuitry 216 as shown by channel allocation settings 218 of FIG. 7). Device 12 and/or equipment 14 may be used in performing the operations of steps 234, 236, and 238.

After the setup operations of steps 234, 236, and 238 have been performed, link 16 may be used to carry data traffic (step 240). During the operations of step 240, the data allocation circuitry in data interface 18 and the data allocation circuitry in data interface 20 may perform real-time data dispersion computations to determine how to place data bytes within the slots of each frame or may use the cached values of channel allocation settings 218 to determine how to allocate data. The transmitting data interface may merge multiple traffic channels into data stream DS at one end of path 16 and the receiving data interface may reconstruct the traffic channels from the received version of the data stream DS at the other end of path 16. Endpoints 22 may be provided with data for respective traffic channels.

This scheme is flexible enough to accommodate a wide range of data rates and traffic channel bandwidths. For example, in a situation involving small traffic channels, the amount of slots used by each traffic channel per superframe may be sufficiently small to allow more three or more traffic channels to coexist in a single slot. An example of this type of arrangement is one in which traffic channel a uses 18 slots per superframe, traffic channel b uses 5 slots per superframe, traffic channel c uses 7 slots per superframe, and traffic channel d uses 22 slots per superframe. If there are 16 frames per superframe (in this example), slot 1 may be completely filled with traffic from channel a and slot 3 may be completely filled with traffic from channel d. Slot 4 may be used to accommodate 4 extra bytes of data from traffic channel d. Slot 2 (in this example) serves as a boundary slot that carries traffic from four channels (2 bytes from channel a, 5 bytes from channel b, 7 bytes from channel c, and 2 bytes from channel d). The data distribution algorithm of FIG. 10 may be used to distribute the data from each of these four channels within slot 2 so as to minimize latency. Because multiple channels can use the same slot, the number of slots that are used in conveying data is minimized.

The foregoing is merely illustrative of the principles of this invention and various modifications can be made by those skilled in the art without departing from the scope and spirit of the invention.

What is claimed is:

1. A method for conveying data over a communications path, comprising:
   with a transmitting data interface, obtaining data corresponding to a plurality of traffic channels; and
   with transmitting data allocation circuitry in the transmitting data interface, combining the data from each of the plurality of traffic channels into a single data stream, wherein the data stream comprises a stream of superframes, each superframe containing a plurality of frames, each frame comprising a plurality of data slots including at least one boundary slot, wherein the boundary slot carries data for one of the plurality of traffic channels in a first subset of the frames in a given superframe, wherein the boundary slot carries data for another of the plurality of traffic channels in a second subset of the frames in the given superframe, wherein at least two of the traffic channels carry audio data.

2. The method defined in claim 1 wherein the transmitting data interface forms part of an electronic device that communicates over the communications path with a receiving data interface in electronic equipment, the method further comprising:
   with the transmitting data interface, transmitting the data stream to the receiving data interface.

3. The method defined in claim 2 wherein the receiving data interface comprises receiving data allocation circuitry, the method further comprising:
   receiving the transmitted data stream with the receiving data interface; and
   with the receiving data allocation circuitry in the receiving data interface, reconstructing the plurality of traffic channels.

4. The method defined in claim 3 wherein the electronic equipment comprises a plurality of endpoints, the method further comprising:
   providing the reconstructed traffic channels to respective endpoints in the plurality of endpoints.

5. The method defined in claim 3 wherein the electronic equipment comprises a plurality of speakers, the method further comprising:
   providing the reconstructed traffic channels to respective speakers in the plurality of speakers.

6. The method defined in claim 3 wherein combining the data from each of the plurality of traffic channels into the single data stream comprises combining the audio data from each of the plurality of traffic channels into the single data stream.

7. The method defined in claim 2 wherein at least some of the slots in each frame are empty and wherein transmitting the data stream comprises transmitting frames that include empty slots.

8. Electronic equipment that is configured to receive data from an electronic device over a communications path, comprising:
   an audio connector in the path that has at least first and second terminals;
   a differential receiver that receives differential data signals from the first and second terminals and that supplies a corresponding digital data stream;
   a data interface that receives the digital data stream and that extracts multiple traffic channels of data from the digital data stream; and
   a plurality of speakers, wherein the data interface provides each of the extracted traffic channels to a respective one of the speakers, wherein the digital data stream comprises a plurality of superframes, wherein each superframe comprises a plurality of frames, wherein each frame comprises a plurality of data slots including at least one boundary slot, wherein the boundary slot carries data for one of the traffic channels in a first subset of the frames in a given superframe, and wherein the boundary slot carries data for another of the traffic channels in a second subset of the frames in the given superframe, the data interface comprising:
      data allocation circuitry that extracts the multiple traffic channels of data from the digital data stream.

9. The electronic equipment defined in claim 8 wherein the data interface comprises a plurality of buffers coupled to the data allocation circuitry and wherein each of the multiple traffic channels of data is passed through a respective one of the buffers.

10. The electronic equipment defined in claim 9 further comprising at least one microphone that gathers microphone signals, wherein the data interface is configured to transmit digital versions of the microphone signals over the communications path.

11. The electronic equipment defined in claim 8 wherein the audio connector comprises a male tip-ring-ring-sleeve audio connector.

12. An electronic device, comprising:
   audio circuitry that generates digital audio signals in a plurality of traffic channels;
   a connector having at least first and second contacts, wherein the connector is electrically coupled to a wired communications path; and
   data interface circuitry that transmits the digital audio signals through the first and second contacts in a data stream having superframes, each superframe containing a plurality of frames, and each frame having a plurality of data slots, wherein at least some of the data slots are filled with the digital audio signals and wherein at least one of the data slots is a boundary slot that conveys the first and second traffic channels in respective frames.

13. The electronic device defined in claim 12 wherein the plurality of traffic channels include at least first and second traffic channels with different capacities and wherein the data interface circuitry is configured to transmit data bytes for the first and second traffic channels in the data slots that are filled with the digital audio signals.

14. The electronic device defined in claim 13 wherein at least some of the data slots in each frame are empty and wherein the connector comprises an audio connector.

15. The electronic device defined in claim 14 wherein the audio connector comprises at least a tip contact, a ring contact, and a sleeve contact.

16. The electronic device defined in claim 15 further comprising a differential transmitter associated with the data interface circuitry that transmits the data stream through first and second contacts, wherein the first and second contacts are part of an audio connector and are selected from the group consisting of: a left audio contact, a right audio contact, a microphone contact, and a ground contact.

* * * * *